United States Patent
Chahal et al.

(10) Patent No.: US 12,519,731 B2
(45) Date of Patent: Jan. 6, 2026

(54) METHOD AND SYSTEM FOR GENERATING A DATA MODEL FOR PREDICTING DATA TRANSFER RATE

(71) Applicant: Tata Consultancy Services Limited, Mumbai (IN)

(72) Inventors: Dheeraj Chahal, Pune (IN); Surya Chaitanya Venkata Palepu, Bangalore (IN); Mayank Mishra, Thane West (IN); Rekha Singhal, Thane West (IN); Manju Ramesh, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 342 days.

(21) Appl. No.: 18/322,115

(22) Filed: May 23, 2023

(65) Prior Publication Data

US 2023/0421504 A1  Dec. 28, 2023

(30) Foreign Application Priority Data

Jun. 24, 2022  (IN) .............................. 202221036453

(51) Int. Cl.
*H04L 47/2425* (2022.01)
*H04L 41/16* (2022.01)
*H04L 43/0894* (2022.01)

(52) U.S. Cl.
CPC .......... *H04L 47/2425* (2013.01); *H04L 41/16* (2013.01); *H04L 43/0894* (2013.01)

(58) Field of Classification Search
CPC . H04L 43/08; H04L 43/0876; H04L 43/0894; H04L 41/08; H04L 41/0823;
(Continued)

(56) References Cited

U.S. PATENT DOCUMENTS 9,634,955 B2   4/2017 Jun et al.
2015/0113117 A1* 4/2015 Jun ..................... H04L 43/0876
                                                       709/224
(Continued)

FOREIGN PATENT DOCUMENTS

DE      201910218827      4/2021

OTHER PUBLICATIONS

Karn et al., "Dynamic Autoselection and Autotuning of Machine Learning Models for Cloud Network Analytics", IEEE Transactions on Parallel and Distributed Systems, vol. 30, Issue 5, May 1, 2019, pp. 1052-1064, 10.1109/TPDS.2018.2876844 (Year: 2019).*

(Continued)

*Primary Examiner* — Paul H. Masur
(74) *Attorney, Agent, or Firm* — Finnegan, Henderson, Farabow, Garrett & Dunner, LLP

(57) ABSTRACT

Heterogeneous cloud storage services offered by different cloud service providers have unique deliverable performance. One key challenge is to find the maximum achievable data transfer rate from one cloud service to another. The disclosure herein generally relates to cloud computing, and, more particularly, to a method and system for parameter tuning in cloud network. The system obtains optimum value of parameters of a source cloud and a destination cloud in a cloud pair, by performing a parameter tuning. The optimum value of parameters and corresponding data transfer rate is used as a training data to generate a data model. The data model processes real-time information with respect to cloud pairs, and predicts corresponding data transfer rate.

6 Claims, 8 Drawing Sheets

(58) Field of Classification Search
CPC ..... H04L 41/083; H04L 41/14; H04L 41/146; H04L 41/16; H04L 41/50; H04L 41/5003; H04L 41/5019; H04L 41/5025
See application file for complete search history.

(56) References Cited

U.S. PATENT DOCUMENTS

| | | | | |
|---|---|---|---|---|
| 2018/0095778 | A1* | 4/2018 | Aydelott | G06F 9/5055 |
| 2018/0351816 | A1* | 12/2018 | Li | G06F 11/3452 |
| 2023/0318947 | A1* | 10/2023 | Janakiraman | H04L 43/12 |
| | | | | 709/224 |
| 2024/0354022 | A1* | 10/2024 | Waghmare | G06F 11/3006 |

OTHER PUBLICATIONS

Xu et al., "Modelling cloud service latency and availability using a deep learning strategy", May 27, 2021, Expert Systems with Applications, vol. 182, https://doi.org/10.1016/j.eswa.2021.115121, p. 1-14 (Year: 2021).*

* cited by examiner

METHOD AND SYSTEM FOR GENERATING A DATA MODEL FOR PREDICTING DATA TRANSFER RATE

PRIORITY CLAIM

This U.S. patent application claims priority under 35 U.S.C. § 119 to: Indian Patent Application No. 202221036453, filed on Jun. 24, 2022. The entire contents of the aforementioned application are incorporated herein by reference.

TECHNICAL FIELD

The disclosure herein generally relates to cloud computing, and, more particularly, to a method and system for parameter tuning in cloud network.

BACKGROUND

The use of highly scalable cloud platforms for web microservices and IoT applications is well known. However, their use for data-intensive applications is restricted due to certain limitations. For example, if the cloud service is being offered is serverless cloud, stateless nature of serverless functions may adversely affect certain applications. Any data retrieval, storage, and peer to peer communication requirement of an application in a cloud based deployment is satisfied using cloud storage services such as object storage, database, cache, etc. The heterogeneous cloud storage services offered by different cloud service providers have unique deliverable performance. One key challenge is to find the maximum achievable data transfer rate from cloud service/platforms to another cloud storage services.

SUMMARY

Embodiments of the present disclosure present technological improvements as solutions to one or more of the above-mentioned technical problems recognized by the inventors in conventional systems. For example, in one embodiment, a processor implemented method is provided. The method involves initially obtaining a list of parameters of a source cloud and a destination cloud for an instance, via one or more hardware processors. Further, the parameters of the source cloud and the destination cloud are initialized with a corresponding defined minimum value, via the one or more hardware processors. Further, value of data transfer rate between the source cloud and the destination cloud, for the initialized values of the parameters, is determined, via the one or more hardware processors. The determined value of data transfer rate is then compared with a threshold of data transfer rate, via the one or more hardware processors. Further, the parameters of the source cloud and the destination cloud are tuned if the determined value of data transfer rate is below the threshold of data transfer rate, via the one or more hardware processors. Tuning the parameters comprises the following steps. Initially, each of the parameters of the source cloud and the destination cloud is selected one at an instance. Further, value of the selected parameter at each instance is iteratively varied by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein value of the selected parameter obtained after iteratively varying the value till the stoppage criteria is satisfied forms an optimum value of the selected parameter. Further, a training data is generated, wherein the training data comprising the optimum value of all parameters of the source cloud and the target cloud, and a corresponding value of the data transfer rate.

In another aspect, a system is provided. The system includes one or more hardware processors, a communication interface, and a memory storing a plurality of instructions. The plurality of instructions when executed, cause the one or more hardware processors to obtain a list of parameters of a source cloud and a destination cloud for an instance. Further, the parameters of the source cloud and the destination cloud are initialized with a corresponding defined minimum value, via the one or more hardware processors. Further, value of data transfer rate between the source cloud and the destination cloud, for the initialized values of the parameters, is determined, via the one or more hardware processors. The determined value of data transfer rate is then compared with a threshold of data transfer rate, via the one or more hardware processors. Further, the parameters of the source cloud and the destination cloud are tuned if the determined value of data transfer rate is below the threshold of data transfer rate, via the one or more hardware processors. Tuning the parameters comprises the following steps. Initially, each of the parameters of the source cloud and the destination cloud is selected one at an instance. Further, value of the selected parameter at each instance is iteratively varied by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein value of the selected parameter obtained after iteratively varying the value till the stoppage criteria is satisfied forms an optimum value of the selected parameter. Further, a training data is generated, wherein the training data comprising the optimum value of all parameters of the source cloud and the target cloud, and a corresponding value of the data transfer rate.

In yet another aspect, a non-transitory computer readable medium is provided. The non-transitory computer readable medium comprises a plurality of instructions, which when executed, cause one or more hardware processors to perform the following steps involved in generating the training data. Initially obtaining a list of parameters of a source cloud and a destination cloud for an instance, via one or more hardware processors. Further, the parameters of the source cloud and the destination cloud are initialized with a corresponding defined minimum value, via the one or more hardware processors. Further, value of data transfer rate between the source cloud and the destination cloud, for the initialized values of the parameters, is determined, via the one or more hardware processors. The determined value of data transfer rate is then compared with a threshold of data transfer rate, via the one or more hardware processors. Further, the parameters of the source cloud and the destination cloud are tuned if the determined value of data transfer rate is below the threshold of data transfer rate, via the one or more hardware processors. Tuning the parameters comprises the following steps. Initially, each of the parameters of the source cloud and the destination cloud is selected one at an instance. Further, value of the selected parameter at each instance is iteratively varied by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein value of the selected parameter obtained after iteratively varying the value till the stoppage criteria is satisfied forms an optimum value of the selected parameter. Further, a training data is generated, wherein the training data comprising the optimum value of all parameters of the source cloud and the target cloud, and a corresponding value of the data transfer rate.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
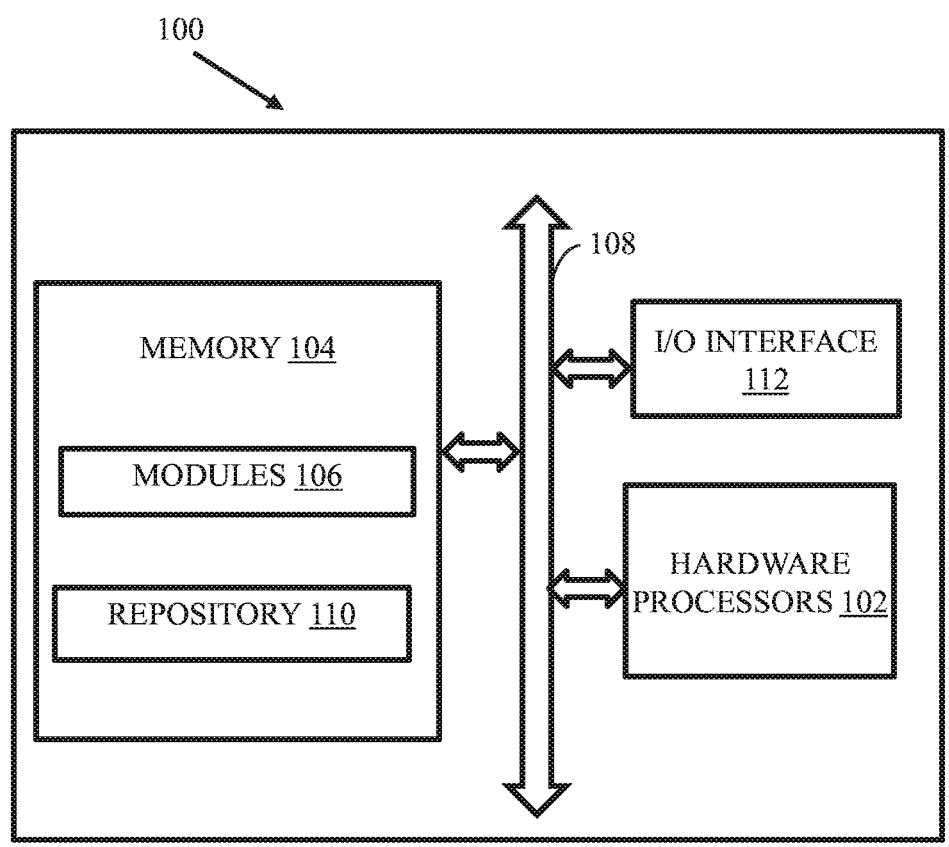
FIG. 1 illustrates an exemplary system for generating training data related to parameter tuning, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The use of highly scalable cloud platforms for web microservices and IoT applications is well known. However, their use for data-intensive applications is restricted due to certain limitations. For example, if the cloud service is being offered is serverless cloud, stateless nature of serverless functions may adversely affect certain applications. Any data retrieval, storage, and the peer to peer communication requirement of an application in a cloud based deployment is satisfied using cloud storage services such as object storage, database, cache, etc. The heterogeneous cloud storage services offered by different cloud service providers have unique deliverable performance. One key challenge is to find the maximum achievable data transfer rate from cloud service/platforms to another cloud storage services.

In order to address this challenge, embodiments disclosed herein provide a method and system for generating training data to generate a data model, which can be used for predicting data transfer rate for a cloud pair. The system generates the training data by determining optimum values of parameters of a source cloud and a target cloud in the cloud pair, by performing a parameter tuning. The parameter tuning involves tuning/changing values of the parameters based on some constraints/criteria, such that at the end of the parameter tuning, optimum values of the parameters of a source cloud and a target cloud in the cloud pair are obtained.

Referring now to the drawings, and more particularly to FIG. 1 through FIG. 5D, where similar reference characters denote corresponding features consistently throughout the figures, there are shown preferred embodiments and these embodiments are described in the context of the following exemplary system and/or method.

FIG. 1 illustrates an exemplary system for generating training data related to parameter tuning, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of generating the training data, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for generating the training data.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 and FIG. 3.

Figure 2:
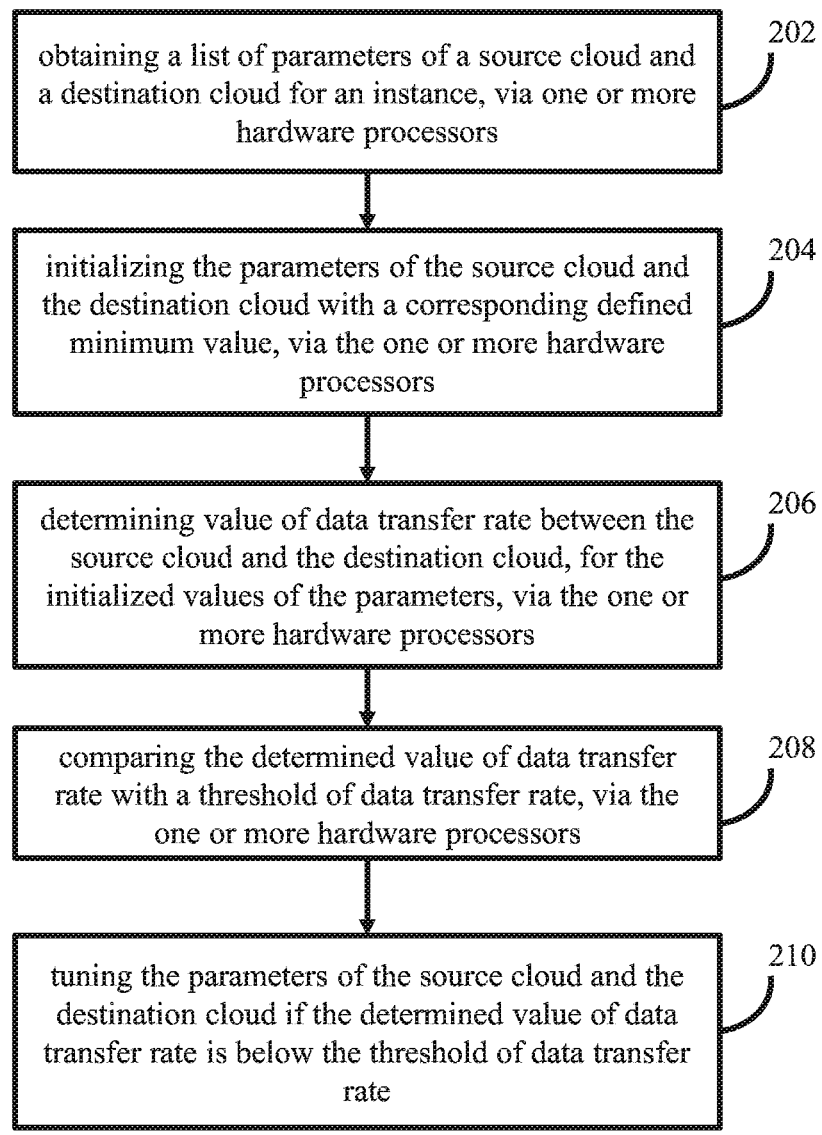
FIG. 2 is a flow diagram depicting steps involved in the process of generating the training data related to parameter tuning, by the system of FIG. 1, according to some embodiments of the present disclosure.

FIG. 2 is a flow diagram depicting steps involved in the process of generating the training data related to parameter tuning, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the steps of flow diagrams in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 obtains a list of parameters of a source cloud and a destination cloud for an instance, via one or more hardware processors. The list of parameters includes information on all parameters/variables of the source cloud and the destination cloud. For examples, information such as number of cores, storage capacity, processing speed, and so on, which indicate/represent technical specifications of the clouds, and so on may be obtained in the parameter list. Further, at step 204 of the method 200, the system 100 initializes the parameters of the source cloud and the destination cloud with a corresponding defined minimum value, via the one or more hardware processors. In an embodiment, the minimum value of various types of parameters is pre-configured with the system 100. For example, the defined minimum value of the number of cores maybe 2.

Further, at step 206 of the method 200, the system 100 determines value of data transfer rate between the source cloud and the destination cloud, for the initialized values of the parameters, via the one or more hardware processors. The source cloud and destination cloud maybe alternately referred to as 'source cloud service' and 'destination cloud service' respectively. In order to determine the value of data transfer rate, the system 100 may either simulate the transfer between the source cloud and the destination cloud, or may run a real-time test with a sample data. Further, at step 208 of the method 200, the system 100 compares the determined value of data transfer rate with a threshold of data transfer rate, via the one or more hardware processors. The threshold of data transfer rate represents maximum value of data transfer rate (network bandwidth) provided by a cloud service provider. In various embodiments, the value of the threshold of data transfer rate maybe pre-defined or dynamically configured to suite requirements, and maybe reconfigured as maybe required. The threshold of data transfer rate indicates/represents an expected/desired minimum data transfer rate to cater to data transfer requirements between the source and destination clouds.

Figure 3:
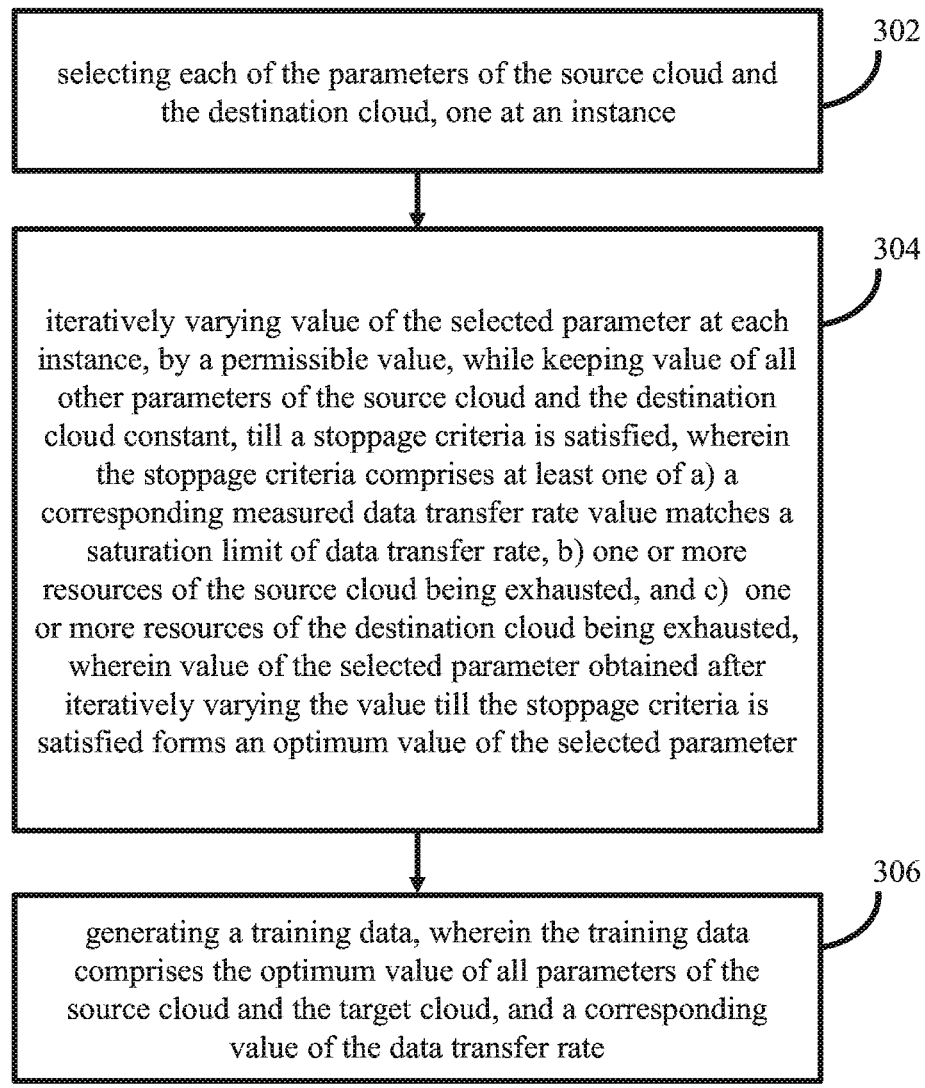
FIG. 3 is a flow diagram depicting steps involved in the process of parameter tuning being done by the system of FIG. 1, according to some embodiments of the present disclosure.
Figure 4:
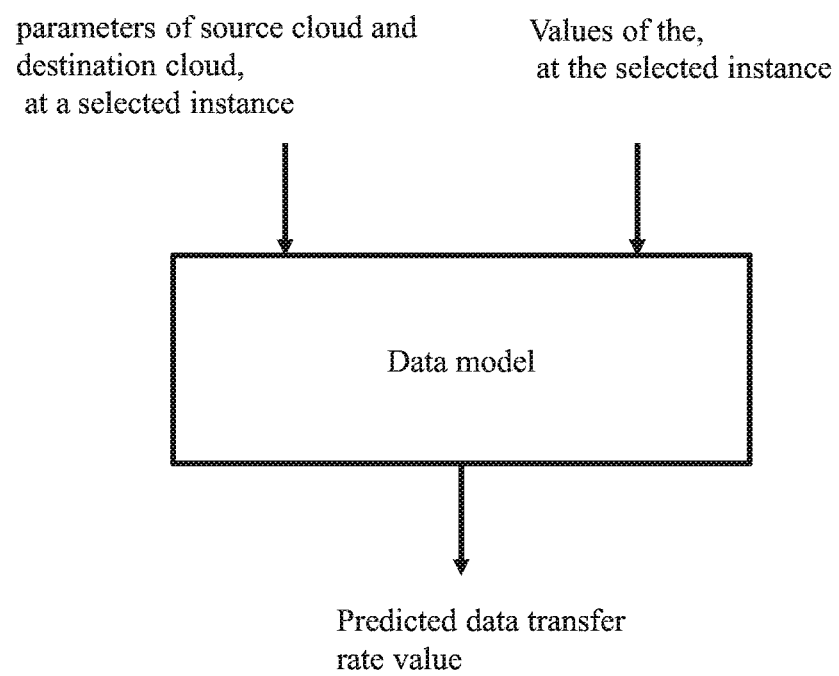
FIG. 4 depicts a practical implementation of a data model generated using the training data generated by the system of FIG. 1, according to some embodiments of the present disclosure.

Further, at step 210 of the method 200, the system 100 tunes the parameters of the source cloud and the destination cloud if the determined value of data transfer rate is below the threshold of data transfer rate, via the one or more hardware processors. Various steps involved in the process of tuning the parameters are depicted in FIG. 3 and are explained hereafter.

At step 302 of the method 300, the system 100 selects each of the parameters of the source cloud and the destination cloud, one at an instance. In an embodiment, the selection of the parameters of the source cloud and the destination cloud is based on a priority assigned to each of the parameters of the source cloud and the destination cloud. Further, at step 304 of the method 300, the system 100 iteratively varies value of the selected parameter at each instance, by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein value of the selected parameter obtained after iteratively varying the value till the stoppage criteria is satisfied, forms an optimum value of the selected parameter. The 'saturation limit of data transfer rate' maybe specific to each configuration of a cloud service, and may indicate/represent maximum value of data transfer rate that maybe obtained for a given configuration of the cloud service. With the optimum values of the parameters obtained by virtue of the parameter tuning, corresponding data transfer rate value is calculated.

In an embodiment, as the parameter tuning essentially establishes a synchronization between the parameters in the source cloud and the destination cloud, the corresponding value of data transfer rate ideally exceeds the threshold of data transfer rate. Further, at step 306 of the method 300, the system 100 generates the training data, wherein the training data comprises the optimum value of all parameters of the source cloud and the target cloud, and a corresponding value of the data transfer rate.

An algorithmic representation of the method 200 and method 300 is given as:

Step 1: For any two given cloud services forming source and destination end points the following notations are used, Source endpoint S, Destination endpoint D, and Network T connecting S and D.

$T_b$ denotes the bandwidth of T.

Prioritized list of source end point parameters $P_S=[P_S^1, P_S^2, \ldots, P_S^M]$, where, priority is in descending order.

Prioritized list of destination end point parameters $P_D=[P_D^1, P_D^2, \ldots, P_D^N]$, where, priority is in descending order.

S has set of resources $R_S$, and D has set of resources $R_D$.

Step 2: Initialize i=1.

Step 3: Consider all parameter in $P_S$, Initialize them with the minimum permissible value for the given cloud service.

Step 4: Consider all parameter in $P_D$, Initialize them with the minimum permissible value for the given cloud service.

Step 5: Find data transfer rate f between S and D.

Step 6: If $f<T_b$ and If r, where $r \in R_{e1} \cup R_{e2}$, has become bottleneck, then go to Step 8.

Step 7: Incrementing each parameter in $P_S$ by permissible values except $P_S^i$. Go to Step 5.

Step 8: Initialize $P_D^j$ with minimum permissible value for the given cloud service at destination end point.

Step 9: Find data transfer rate f between S and D.

Step 10: If $f<T_b$ and If r, where $r \in R_{e1} \cup R_{e2}$, has become bottleneck, then go to Step 12.

Step 11: Incrementing each parameter in $P_D$ by permissible values except Go to Step 9.

Step 12: Increment parameter $P_S^i$ by next permissible value of i. If no permissible value is left then go to further.

Step 13: Consider all parameter in $P_S$, Initialize them with the minimum permissible value except $P_S^i$. Go to Step 4.

Step 14: Stop.

The training data thus obtained is then used by the system 100 to train and generate a data model. The data model is then used to process real-time information with respect to configuration of cloud pairs (i.e. a source cloud and a destination cloud), and predict corresponding data transfer rate value. The data obtained as the real-time information include, but not limited to, a) parameters of the source cloud and the destination cloud, at a selected instance, and b) values of the parameters of the source cloud and the destination cloud at the selected instance. For the obtained real-time information, the system 100 identifies matching data in the data model, and upon finding a match, determines corresponding data transfer rate value. Further, the system 100 generates a prediction based on the determined data transfer rate value.

Experimental Data

To evaluate the data transfer rate across various cloud services, synthetic data made of PyTorch tensors was used. A python script that generates a load of specified data size using tensors was used. Communication with Memcached of ElastiCache® was established using the pymemcache library. Depending upon the target storage services, the data to be transferred was fragmented. The data transfer to key-value storage service is challenging due to the limitation on the data item size. For example, DynamoDB has a limitation of 400 KB on each data item that would reside as a value in the key-value store, whereas Firestore® allows 1 MB data item sizes and CosmosDB allows up to 2 MB of data item size. Hence, the transfer of larger data items requires chunking of items into multiple smaller fragments. The increase in the number of chunks to store data items results in lower data transfer rates. To optimize the data transfer, parallelism was employed and the chunks were transferred in parallel in tables of key-value store database services.

While performing each experiment, it was ensured that none of the resources is idle due to the unavailability of the data to ingress and data transfer rate is saturated only due to the bottleneck in one of the resources or services. Each experiment was run for at least three minutes and the average value of the data transfer rate was recorded.

In AWSLambda experiments, memory configurations were changed between 2 GB and 10 GB where the compute allocated was directly proportional to the memory configured. A maximum of 6 cores were allocated with a 10 GB configuration. However, in Google Cloud Platform (GCP) Cloud functions the maximum available cores were restricted to 2 cores (which is independent of memory configured). A consumption plan with Azure functions where memory allocation is based on the runtime demand and manual configuration is not possible, was used.

Experimental Evaluation:

Observations from the experiments are discussed and analyzed with an aim of benchmarking the data transfer between serverless platforms and storage services. The data transfer performance of the three cloud vendors were compared too. It is to be noted that the serverless platforms have been selected only as an example, and similar approach may be used for other cloud services as well.

Serverless Platforms to Object Storage

In this experiment, the maximum achievable data transfer rate between serverless platforms and their corresponding object storage services in AWS, Azure, and GCP were studied. It was observed that the maximum data transfer rate between AWS Lambda and S3 (as in FIG. 5B) is achieved when instances are configured with the maximum possible memory (10 GB) which results in the allocation of the maximum number of cores per instance (6 cores). Additionally, the data transfer rate drops when more than 6 threads transfer data concurrently from a serverless instance. Likewise, in the case of the GCP functions to Cloud storage transfer, the maximum transfer rate is achieved with 8 GB memory allocation (2 cores) to the function. Contrary to Lambda, a change in the number of threads in GCP functions does not affect data transfer rate much. In Azure functions with a consumption plan (memory allocated automatically based on the requirement), the data transfer rate increases with an increase in the number of threads used to transfer data.

Serverless Platforms to Caches

Figure 5A:
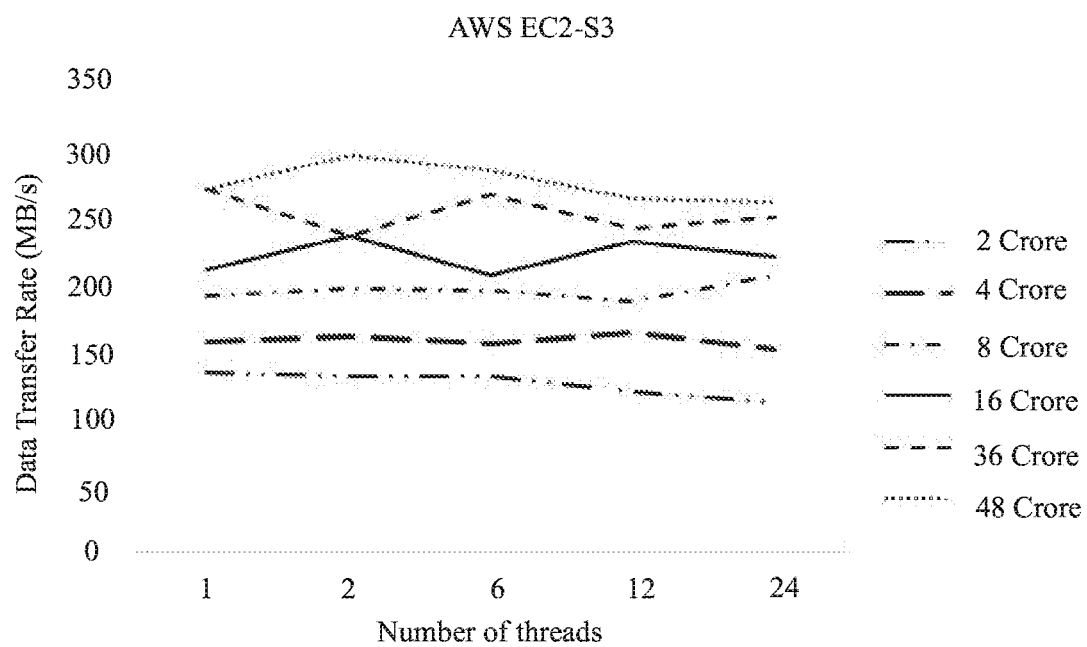
FIGS. 5A, 5B, 5C, and 5D depict exemplary graphs with experimental data, according to some embodiments of the present disclosure.
Figure 5B:
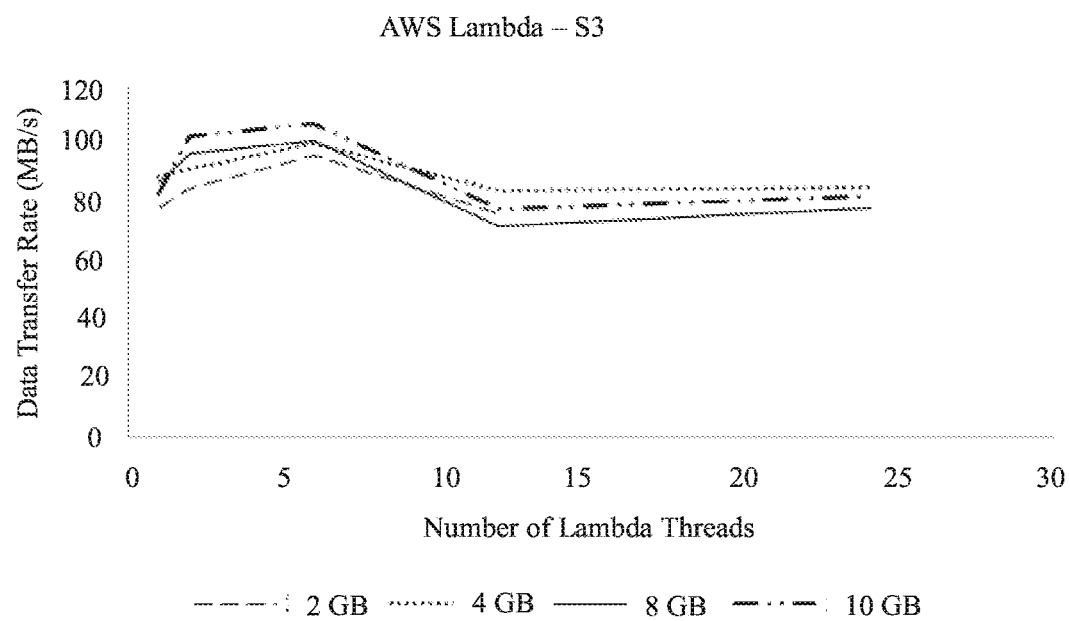
Figure 5C:
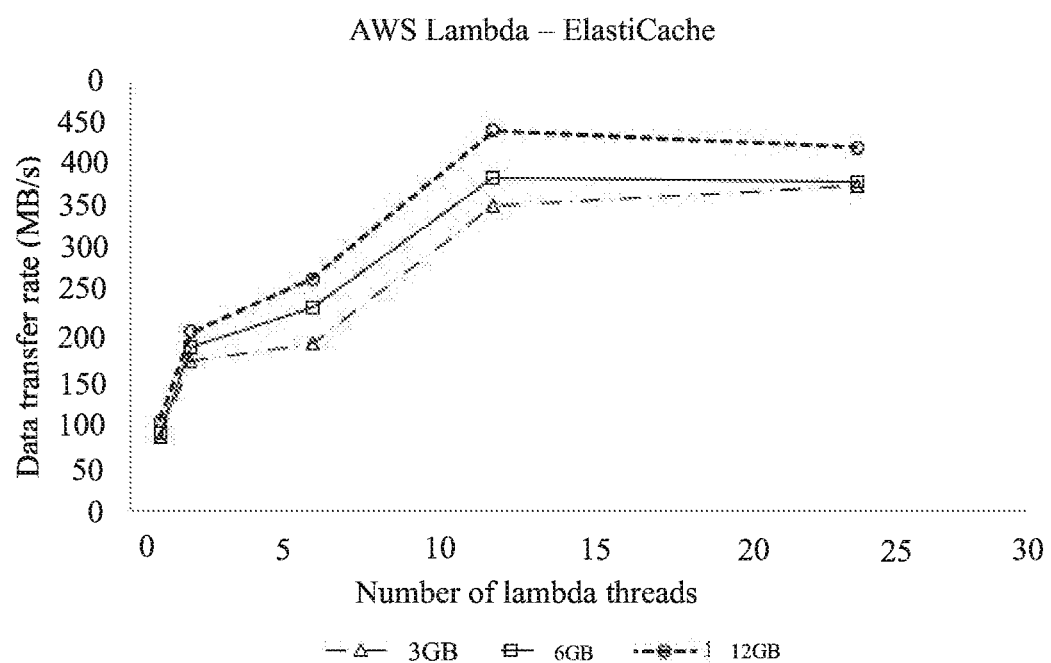

A set of experiments was conducted to study the data transfer rate between serverless instances and cache services available in AWS, GCP, and Azure. The data transfer rate while changing the number of threads in the serverless instances and increasing the memory of cache nodes were observed. The data transfer rate increases with an increase in the number of threads (up to 12) and then stabilizes. The maximum data transfer rate is achieved when one Elasti-Cache node is used. This is depicted in FIG. 5C. Similar trends are observed with GCP Memorystore and Azure Cache.

Serverless Platforms to Key-Value Store

Figure 5D:
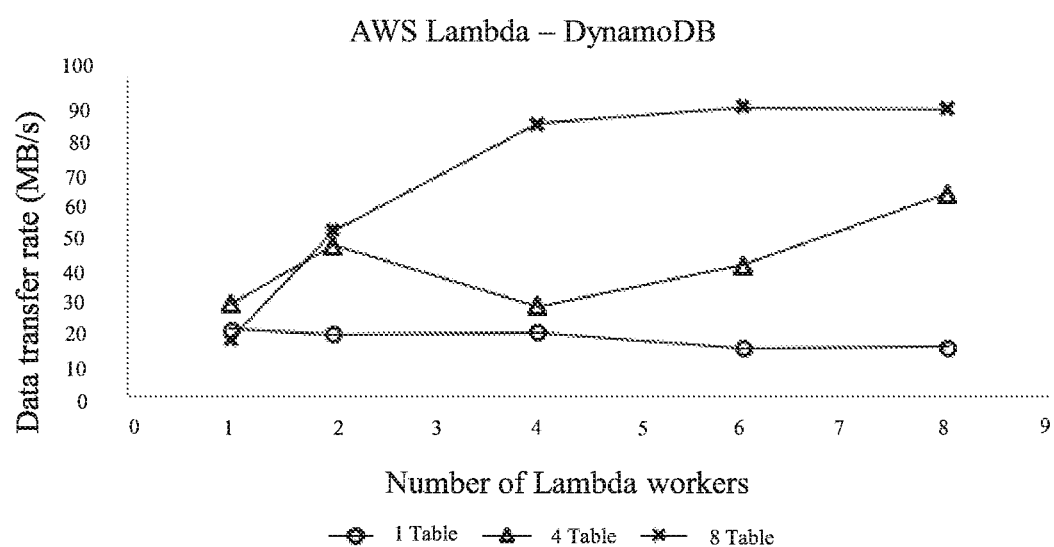

In this experiment, the rate of data transfer value from a serverless platform to a key-value data store was calculated. A significant change in the data transfer rate with changes in the number of threads or workers in the Lambda platform and the number of tables used to store the data in the key-value store was observed. The maximum data transfer rate is observed when the number of workers is close to the number of maximum cores available in the serverless instances (6 cores in Lambda). Also, spawning data across multiple tables in the database results in a higher transfer rate, as depicted in FIG. 5D. This is primarily because of the parallelism available in the cloud database services. However, no change in the data transfer rate was observed with a change in database tables or threads in the GCP functions. A significant improvement was observed in the data transfer rate between Azure functions and CosmosDB with an increase in the number of tables used to store the data in the database.

Comparison of Serverless Platforms for Data Transfer

From the comparison of AWS Lambda, Azure functions, and Google Cloud functions data transfer rate to object storage, caches, and key-value store databases, it was observed that the maximum data transfer rate was achieved in Azure function and its Blob storage. The gap between Azure, AWS, and GCP widened with the increase in number of threads. This is due to the fact that Lambda and GCP function transfer rate does not increase with concurrency like the Azure function. The AWS Lambda and Memcached outperform both GCP Memorystore and Azure Cache. However, GCP functions and Memorystore transfer rate is better than Azure function and its cache service. Comparison of AWS, GCP, and Azure data transfer to their corresponding database services was performed. AWS Lambda to DynamoDB transfer rate is significantly better than GCP functions to Firestore® and Azure function to CosmosDB. The data transfer between VMs of different types (2 cores to 48 cores) available as IaaS from AWS EC2 service and storage services as shown in FIG. 5A were also studied. For each of the storage services, data transfer from VMs was higher than serverless platforms. From the benchmarking data presented above the following conclusions were made:

Maximum achievable data transfer rate is dependent on the configuration of serverless instances and the target storage service.

AWS Lambda to cache and database data transfer rate outperforms GCP and Azure function transfers to their corresponding services while Azure to Blob storage is better than AWS and GCP function to their storage services. Additionally, VMs outperform serverless platforms in data transfer acceleration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of data transfer rate prediction for cloud pairs. The embodiment, thus provides a mechanism of obtaining optimum value of parameters by performing parameter tuning, which acts as a training data. Moreover, the embodiments herein further provide a mechanism of predicting data transfer rate value for a cloud pair, using a data model generated using the training data.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   obtaining a list of parameters of a source cloud and a destination cloud for an instance, via one or more hardware processors;
   initializing the parameters of the source cloud and the destination cloud with a corresponding defined minimum value, via the one or more hardware processors;
   determining value of data transfer rate between the source cloud and the destination cloud, for the initialized values of the parameters, via the one or more hardware processors;
   comparing the determined value of data transfer rate with a threshold of data transfer rate, via the one or more hardware processors; and
   tuning the parameters of the source cloud and the destination cloud on ascertaining that the determined value of data transfer rate is below the threshold of data transfer rate, via the one or more hardware processors, wherein tuning the parameters comprises:
   selecting each of the parameters of the source cloud and the destination cloud, one at an instance:
   iteratively varying value of the selected parameter at each instance, by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein the saturation limit of data transfer rate is specific to each configuration of source code and destination cloud, and indicates maximum value of data transfer rate that is obtained for a given configuration of the source cloud and destination cloud and wherein the parameter tuning establishes a synchronization between the parameters in the source cloud and the destination cloud,
   wherein value of the selected parameter obtained after iteratively varying the value till the stoppage criteria is satisfied forms an optimum value of the selected parameter;
   generating a training data, wherein the training data comprises the optimum value of all parameters of the source cloud and the target cloud, and a corresponding value of the data transfer rate
   generating a data model using the training data;
   obtaining a real-time information on a) the parameters of the source cloud and the destination cloud, at a selected instance, and b) values of the parameters of the source cloud and the destination cloud at the selected instance;
   determining the value of data transfer rate for the obtained real-time information by processing the obtained real-time information using the data model by identifying matching data in the data model; and
   generating a prediction of the value of data transfer rate for the real-time information, based on the determined data transfer rate value.

2. The method of claim 1, wherein selection of the parameters of the source cloud and the destination cloud is based on a priority assigned to each of the parameters of the source cloud and the destination cloud.

3. A system, comprising:
   one or more hardware processors;
   a communication interface; and a memory storing a plurality of instructions, wherein the plurality of instructions when executed, cause the one or more hardware processors to:
   obtain a list of parameters of a source cloud and a destination cloud for an instance;
   initialize the parameters of the source cloud and the destination cloud with a corresponding defined minimum value;
   determine value of data transfer rate between the source cloud and the destination cloud, for the initialized values of the parameters;
   compare the determined value of data transfer rate with a threshold of data transfer rate;
   tune the parameters of the source cloud and the destination cloud if the determined value of data transfer rate is below the threshold of data transfer rate, wherein the one or more hardware processors tune the parameters by:
   select each of the parameters of the source cloud and the destination cloud, one at an instance;
   iteratively vary value of the selected parameter at each instance, by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein the saturation limit of data transfer rate is specific to each configuration of a cloud, and indicates maximum value of data transfer rate that is obtained for a given configuration of the cloud and wherein the parameter tuning essentially establishes a synchronization between the parameters in the source cloud and the destination cloud,
   wherein value of the selected parameter obtained after iteratively varying the value till the stoppage criteria is satisfied forms an optimum value of the selected parameter;
   generate a training data, wherein the training data comprises the optimum value of all parameters of the source cloud and the target cloud, and a corresponding value of the data transfer rate;
   generate a data model using the training data;
   obtain a real-time information on a) the parameters of the source cloud and the destination cloud, at a selected instance, and b) values of the parameters of the source cloud and the destination cloud at the selected instance;
   determine the value of data transfer rate for the obtained real-time information by processing the obtained real-time information using the data model by identifying matching data in the data model; and generate a prediction of the value of data transfer rate for the real-time information, based on the determined data transfer rate value.

4. The system of claim 3, wherein the one or more hardware processors are further configured to perform selection of the parameters of the source cloud and the destination cloud based on a priority assigned to each of the parameters of the source cloud and the destination cloud.

5. One or more non-transitory machine-readable information storage mediums comprising one or more instructions which when executed by one or more hardware processors cause:

obtaining a list of parameters of a source cloud and a destination cloud for an instance;

initializing the parameters of the source cloud and the destination cloud with corresponding defined minimum value;

determining value of data transfer rate between the source cloud and the destination cloud, for the initialized values of the parameters;

comparing the determined value of data transfer rate with a threshold of data transfer rate; and tuning the parameters of the source cloud and the destination cloud if the determined value of data transfer rate is below the threshold of data transfer rate, wherein tuning the parameters comprises:

selecting each of the parameters of the source cloud and the destination cloud, one at an instance;

iteratively varying value of the selected parameter at each instance, by a permissible value, while keeping value of all other parameters of the source cloud and the destination cloud constant, till a stoppage criteria is satisfied, wherein the stoppage criteria comprises at least one of a) a corresponding measured data transfer rate value matches a saturation limit of data transfer rate, b) one or more resources of the source cloud being exhausted, and c) one or more resources of the destination cloud being exhausted, wherein the saturation limit of data transfer rate is specific to each configuration of a cloud, and indicates maximum value of data transfer rate that is obtained for a given configuration of the cloud and wherein the parameter tuning essentially establishes a synchronization between the parameters in the source cloud and the destination cloud, wherein value of the selected parameter obtained after iteratively varying the value till the stoppage criteria is satisfied forms an optimum value of the selected parameter;

generating a training data, wherein the training data comprises the optimum value of all parameters of the source cloud and the target cloud, and a corresponding value of the data transfer rate;

generating a data model using the training data;

obtaining a real-time information on a) the parameters of the source cloud and the destination cloud, at a selected instance, and b) values of the parameters of the source cloud and the destination cloud at the selected instance;

determining the value of data transfer rate for the obtained real-time information by processing the obtained real-time information using the data model by identifying matching data in the data model; and generating a prediction of the value of data transfer rate for the real-time information, based on the determined data transfer rate value.

6. The one or more non-transitory machine-readable information storage mediums of claim 5, wherein selection of the parameters of the source cloud and the destination cloud is based on a priority assigned to each of the parameters of the source cloud and the destination cloud.

\* \* \* \* \*